(12) United States Patent
Brodie et al.

(10) Patent No.: US 9,292,347 B2
(45) Date of Patent: Mar. 22, 2016

(54) STATUS TOOL TO EXPOSE METADATA READ AND WRITE QUEUES

(71) Applicant: MICROSOFT TECHNOLOGY LICENSING, LLC, Redmond, WA (US)

(72) Inventors: Alexander S. Brodie, Redmond, WA (US); Benjamin L. Perry, Redmond, WA (US); David R. Parlin, Redmond, WA (US); Jae Pum Park, Sammamish, WA (US); Michael J. Gilmore, Bothell, WA (US); Scott E. Dart, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 367 days.

(21) Appl. No.: 13/745,325

(22) Filed: Jan. 18, 2013

(65) Prior Publication Data

US 2013/0132965 A1   May 23, 2013

Related U.S. Application Data

(63) Continuation of application No. 13/165,121, filed on Jun. 21, 2011, now Pat. No. 8,375,007, which is a continuation of application No. 11/341,511, filed on Jan. 30, 2006, now Pat. No. 7,987,160.

(51) Int. Cl.
  *G06F 17/30*    (2006.01)
  *G06F 9/50*    (2006.01)
(52) U.S. Cl.
  CPC ............ *G06F 9/50* (2013.01); *G06F 17/30038* (2013.01)

(58) Field of Classification Search
  CPC .............. G06F 3/0481; G06F 17/3048; G06F 17/30038; G06F 9/50
  USPC ......................................................... 707/822
  See application file for complete search history.

(56) References Cited

U.S. PATENT DOCUMENTS 6,282,548 B1 * 8/2001 Burner ................ G06F 17/3089 1/1
6,493,720 B1 * 12/2002 Chu .................. G06F 17/30353

(Continued)

OTHER PUBLICATIONS

Serves, Risto, et al., "Metadata Creation System for Mobile Images", MobiSys '04, Boston, MA, Jun. 6-9, 2004, pp. 36-48.*

(Continued)

*Primary Examiner* — Robert Stevens
(74) *Attorney, Agent, or Firm* — Bryan Webster; Kate Drakos; Micky Minhas

(57) ABSTRACT

A method to expose status information is provided. The status information is associated with metadata extracted from multimedia files and stored in a metadata database. The metadata information that is extracted from the multimedia files is stored in a read queue to allow a background thread to process the metadata and populate the metadata database. Additionally, the metadata database may be updated to include user-define metadata, which is written back to the multimedia files. The user-defined metadata is included in a write queue and is written to the multimedia files associated with the user-defined metadata. The status of the read and write queues are exposed to a user through a graphical user interface. The status may include the list of multimedia files included in the read and write queues, the priorities of each multimedia file, and the number of remaining multimedia files.

20 Claims, 6 Drawing Sheets

(56) References Cited

U.S. PATENT DOCUMENTS

| | | | |
|---|---|---|---|
| 6,564,215 B1* | 5/2003 | Hsiao | G06F 11/1469 |
| 6,693,652 B1* | 2/2004 | Barrus et al. | 715/838 |
| 7,028,298 B1* | 4/2006 | Foote | 718/104 |
| 7,272,613 B2* | 9/2007 | Sim | G06F 17/30067 707/999.01 |
| 7,386,530 B2* | 6/2008 | Kiessig et al. | |
| 7,548,921 B1* | 6/2009 | Sharkey et al. | 1/1 |
| 7,657,581 B2* | 2/2010 | Orenstein | G06F 11/2097 705/51 |
| 2002/0049738 A1* | 4/2002 | Epstein | G06F 17/30997 |
| 2002/0056123 A1* | 5/2002 | Liwerant et al. | 725/87 |
| 2003/0162159 A1* | 8/2003 | Sheehan | 434/362 |
| 2005/0138195 A1* | 6/2005 | Bono | 709/231 |
| 2006/0004931 A1* | 1/2006 | Weatherspoon | 710/22 |
| 2006/0112124 A1* | 5/2006 | Ando | G11B 27/034 |
| 2006/0242152 A1* | 10/2006 | Tanaka | G06Q 10/00 |
| 2007/0086665 A1* | 4/2007 | Kim | G06F 17/30038 382/239 |
| 2009/0133023 A1* | 5/2009 | Li et al. | 718/102 |

OTHER PUBLICATIONS

Wactlar, Howard D., et al., "Digital Video Archives: Managing Through Metadata", Building a National Strategy for Digital Preservation: Issues in Digital Media Archiving, National Digital Information Infrastructure and Preservation Program, Library of Congress, Apr. 2002, pp. 1-14.*

* cited by examiner

STATUS TOOL TO EXPOSE METADATA READ AND WRITE QUEUES

CROSS-REFERENCE TO RELATED APPLICATION

This application claims priority from, and is a continuation of U.S. application Ser. No. 13/165,121, filed on Jun. 21, 2011, which is a continuation of U.S. application Ser. No. 11/341,511, filed on Jan. 30, 2006, and each are hereby incorporated by reference in their entirety.

STATEMENT REGARDING FEDERALLY SPONSORED RESEARCH OR DEVELOPMENT

Not applicable.

BACKGROUND

Conventionally, photo organization applications provide databases that store information associated with a collection of photos. The photo organization applications provide metadata that may be used by a user to organize the collections of photos. The photo organization application conventionally utilizes a database to associate the metadata with the multimedia files. Because the metadata is not written back to the file, the user is limited to using the photo organization application on the client that created the metadata.

Some photo organizations application may allow the user to expressly indicate that metadata should be stored with the photos and the database. When the metadata is stored with the photos, a user may transfer the photos to a different client and retain the organization structure created by the photo organization application. However, the photo organizations applications that allow the metadata to be written back to photos suffer from long latency periods during which the client is unable to access the photos. Furthermore, the photo organization applications do not provide a user with the status of the metadata write backs. Consequently, a client may exit the photo organization application prior to the completing the write back operations for the photos. The premature exit of the photo organization application may cause the photo to lose some metadata.

SUMMARY

In an embodiment, a method to display status information associated with metadata read and write queues is provided. The metadata read and write queues are utilized by a multimedia organization application to track the metadata updates associated with a metadata database and multimedia files. When the read and write queues contain multimedia files, a status notification indicating the number of remaining files on the read and write queues is generated.

In another embodiment, the status notification may provide detailed information related to the metadata updates. The status notification may include a list of multimedia files stored in the read and write queues, a priority associated with each multimedia file on the list, and a timestamp for each metadata update corresponding to each multimedia file. Additionally, the status notification may be represented by an icon superimposed on representations of each multimedia files included on the read and write queues.

In another embodiment, a computer system for displaying the status of the metadata updates is provided. The computer system may utilize a background thread having a specified priority to process the read and write queues. The status of the multimedia updates is dynamically altered as the background thread processes the read and write queues. Moreover, the computer system may provide a graphical user interface where the user may alter the priorities associated with each multimedia file or the background thread.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Embodiments of the invention expose status notifications related to metadata updates. The metadata updates are associated with multimedia files or a metadata database. Read queues are utilized to track metadata updates that have not been applied to the metadata database, and write queues are utilized to track metadata updates that have not been applied to the multimedia files. A background thread processes the metadata updates included on the read and write queues and updates status notifications associated with the metadata updates. Accordingly, the metadata associated with multimedia files and metadata database may be synched using the read and write queue.

A computer system that generates status notifications associated with metadata updates may include a background thread, a metadata database and a collection of multimedia files. The background thread may process read and write queues storing metadata updates for the metadata database and multimedia files. The status notification may provide a progress report relating to the number of metadata updates remaining in the read and write queues. In an embodiment of the invention, the computer system may be communicatively connected to client devices through a communication network, and the client devices may include a portable device, such as, laptops, personal digital assistants, smart phones, etc.

Figure 1:
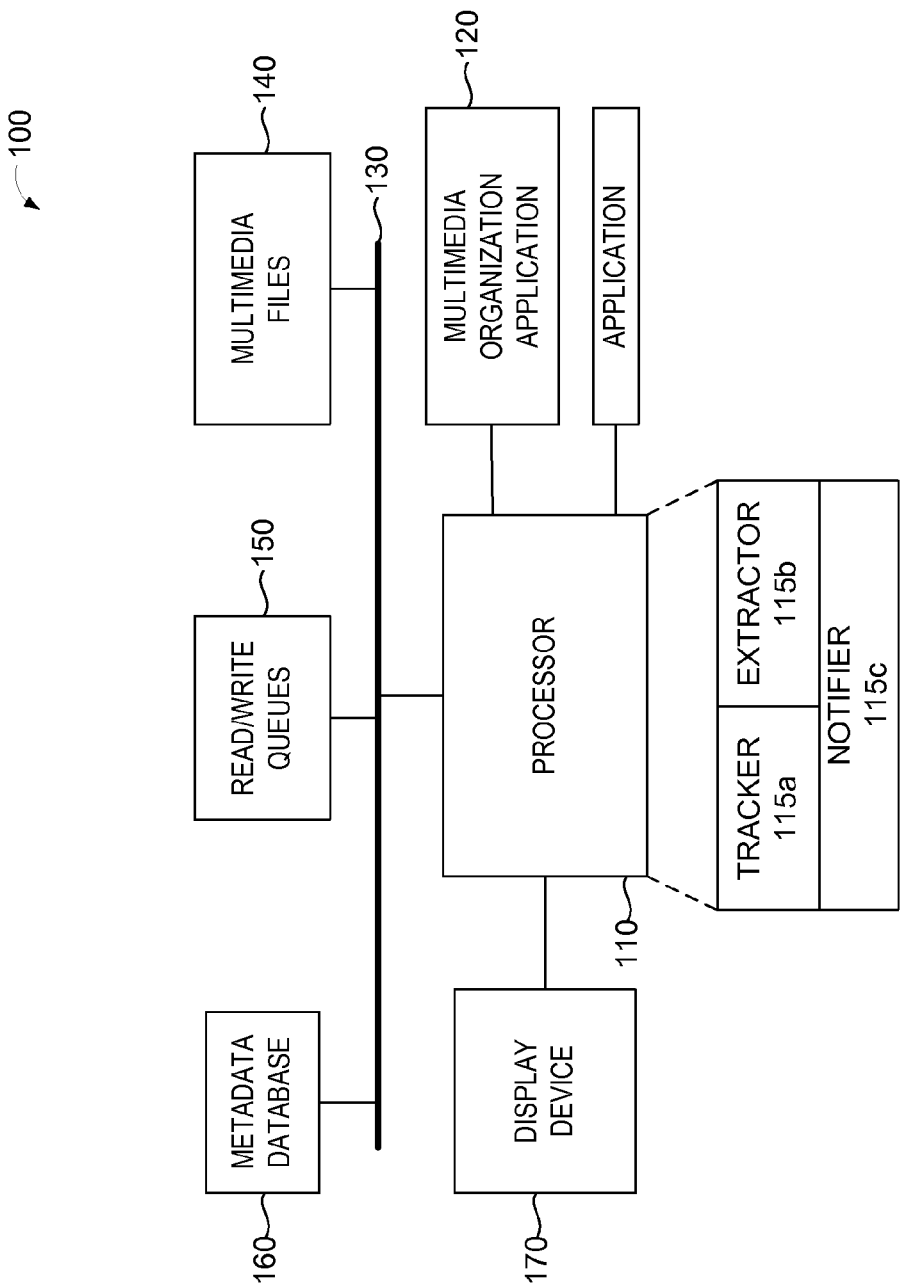
FIG. 1 is a block diagram that illustrates an exemplary computing environment, according to embodiments of the invention.

FIG. 1 is a block diagram that illustrates an exemplary computing environment 100, according to embodiments of the invention. The computing environment 100 is not intended to suggest any limitation as to scope or functionality. Embodiments of the invention are operable with numerous other special purpose computing environments or configurations. With reference to FIG. 1, the computing environment 100 includes a processor 110, multimedia organization application 120, communication bus 130, multimedia file 140, read and write queues 150, a metadata database 160 and a display device 170.

The processor 110 may utilize a background thread 115 to process instruction associated with the multimedia organization application 120. The processor 110 may access the multimedia files 140, read and write queues 150 and the metadata database 160 via the communication bus 130. The background thread 115 may include a tracker 115a, an extractor 115b and a notifier 115c. The tracker 115a scans the multimedia files 140 and metadata database 160 to determine whether a change has occurred. The extractor 115b processes the multimedia file 140 to extract the updated metadata, stores the updated metadata on the appropriate queue 150, and propagates the updated metadata in the proper direction. The notifier 115c generates notification messages that indicate the number of multimedia files 140 being processed by the background thread 115 and the approximate time the before all the multimedia files 140 are completely processed.

Moreover the processor 110 may be coupled to a variety of input devices and computer-readable media via the communication bus 130. The computer-readable media may include computer storage and communication media that are removable or non-removable and volatile or non-volatile. By way of example, and not limitation, computer storage media includes electronic storage devices, optical storages devices, magnetic storage devices, or any medium used to store information that can be accessed by a client device and communication media may include wired and wireless media. The input devices may include, mice, keyboards, joysticks, controllers, microphones, cameras, camcorders, or any suitable device for providing user input.

The multimedia files 140 may include images, video or audio files having metadata that define various attributes associated with the multimedia files. The metadata associated with the multimedia files 140 may include file name, file size, keywords, caption, etc. The multimedia file 140 may also receive metadata from an application other than the multimedia organization application 120. The received metadata may include quality ratings generated by a user of the application. Generally, the background thread 115 detects the changes to the metadata associated with the multimedia file 140. When the multimedia files 140 are updated to include new metadata, the tracker 115a triggers the extractor 115b and notifier 115c. If the metadata database 160 previously stored a reference to the multimedia file 140, only the changed or new metadata is extracted. Otherwise, if the metadata database 160 does not have a reference to the multimedia file, all the metadata stored with the multimedia file is extracted by the extractor 115b. The extracted information is placed on the read queue 150 because the update was made by an application other than the photo organization application 120. Additionally, the extractor 115b processes the read queue to add the extracted metadata to the metadata database 160 and associate the extracted metadata with the multimedia file 140. In an embodiment, the extracted metadata may include descriptions of the multimedia file 140 that were not created by the multimedia capture device. In certain embodiments, the extractor 115a sends the notifier 115c a count representing the number of items in the read queue 150, and the number of items already processed. The extractor 115a also sends a reference including the list of references to multimedia files 140 included in the read queue 150 and a priority associated with each reference. The notifier 115c utilizes the information received from the extractor 115a to generate general and detailed notifications.

The metadata database 160 stores metadata extracted from the multimedia files 140. The metadata database 160 extracts the metadata associated with each multimedia file 140 and creates an entry to store the metadata and a reference to the multimedia file 140. In an embodiment, the extractor 115b may be utilized to obtain the metadata from the multimedia files. The extracted metadata may include the name, size, and captions of each multimedia file 140. The metadata database 160 may store new metadata received from an application, such as the multimedia organization application 120. The multimedia organization application 120 may provide metadata such as, a rating level or keywords to associate with a multimedia file 140. After receiving a metadata update from a graphical user interface associated with the multimedia organization application 120, the received metadata is stored in the metadata database 160, and the tracker 115a triggers the extractor 115b and notifier 115c. The extractor 115b extracts the received metadata from the metadata database 140 and populates the write queue 150 with a reference to the multimedia file 140 and the received metadata updates. Moreover, the extractor 115b processes the entries included on the write queue 150 to propagate the metadata updates to the corresponding multimedia files 140. In certain embodiments, the extractor 115a sends the notifier 115c a count representing the number of items in the write queue 150, and the number of items already processed. The extractor 115a also sends a reference including the list of references to multimedia files 140 included in the write queue 150 and a priority associated with each reference. The notifier 115c utilizes the information received from the extractor 115a to generate general and detailed notifications. Moreover, the multimedia organization application 120 does not lose metadata, if the user exits the multimedia organization application 120 before the synch between the multimedia file 140 and metadata database 160 is complete because the metadata update is persisted in either the metadata database 160 or multimedia file 140.

Accordingly, the read and write queues 150 provide an effective mechanism for ensuring that the metadata of the multimedia files 140 and the metadata database 160 remain consistent. The read and write queue also provide the notifier with the information needed to generate the status notifications.

In an alternate embodiment of the invention, the background thread 115 may be a collection of threads having different priorities. The background thread 115 that processes the metadata updates may have a default priority of low. In an embodiment, a low priority thread is given access to system resources after all high or medium priority threads have completed the tasks associated with the high or medium priority threads. In certain embodiments, a user may alter the priority associated with the background thread 115 to either medium or high priority. Prior to changing the priority of the background thread 115, a check is performed to ensure that the utilization of the system is below a specified threshold level. Raising the priority of the background thread 115 to high or medium provides the background thread with 115 longer and priority access to critical system resources, such as memory and processing cycles. When the background thread 115 is set to a high or medium priority mode, the read and write queues will be processed faster than when the background thread 115 is in a low priority mode.

The status of the read and write queues may be sent to a display device 170 to ensure that status notifications are presented on the graphical user interface. The communication bus 130 provides the processor 110 access to the read and write queues and enables the background thread 115 to generate progress reports, which are rendered on the display device 170. Alternatively, the communication bus 130 may be a local area network, a wide area network, satellite network, wireless network or the Internet. The display device 130 may include laptops, smart phones, personal digital assistants, or desktop computers. The display device 130 may utilize the communication bus 130 to communicate with the multimedia organization application 120. The computing environment 100 illustrated in FIG. 1 is exemplary and other configurations are within the scope of the invention.

In an embodiment of the invention, status notifications are sent to a graphical user interface associated with a multimedia organization application. The graphical user interface may include a command area, and a thumbnail section. The command area includes a collection of actions that may be performed on multimedia files. The thumbnail section displays thumbnails for the multimedia files. When processing metadata updates associated with the metadata database or multimedia file, a processing icon is superimposed on the thumbnail of the multimedia files being processed. In an alternate embodiment, the processing icon may be superimposed on the thumbnail of each multimedia file having a metadata update on the read or write queues. The processing icon may distinguish whether the metadata update is on the read queue, write queue or both. Additionally, the status notification may include an indication conveying that metadata updates are being processed and the number of remaining updates that must be processed.

Figure 3:
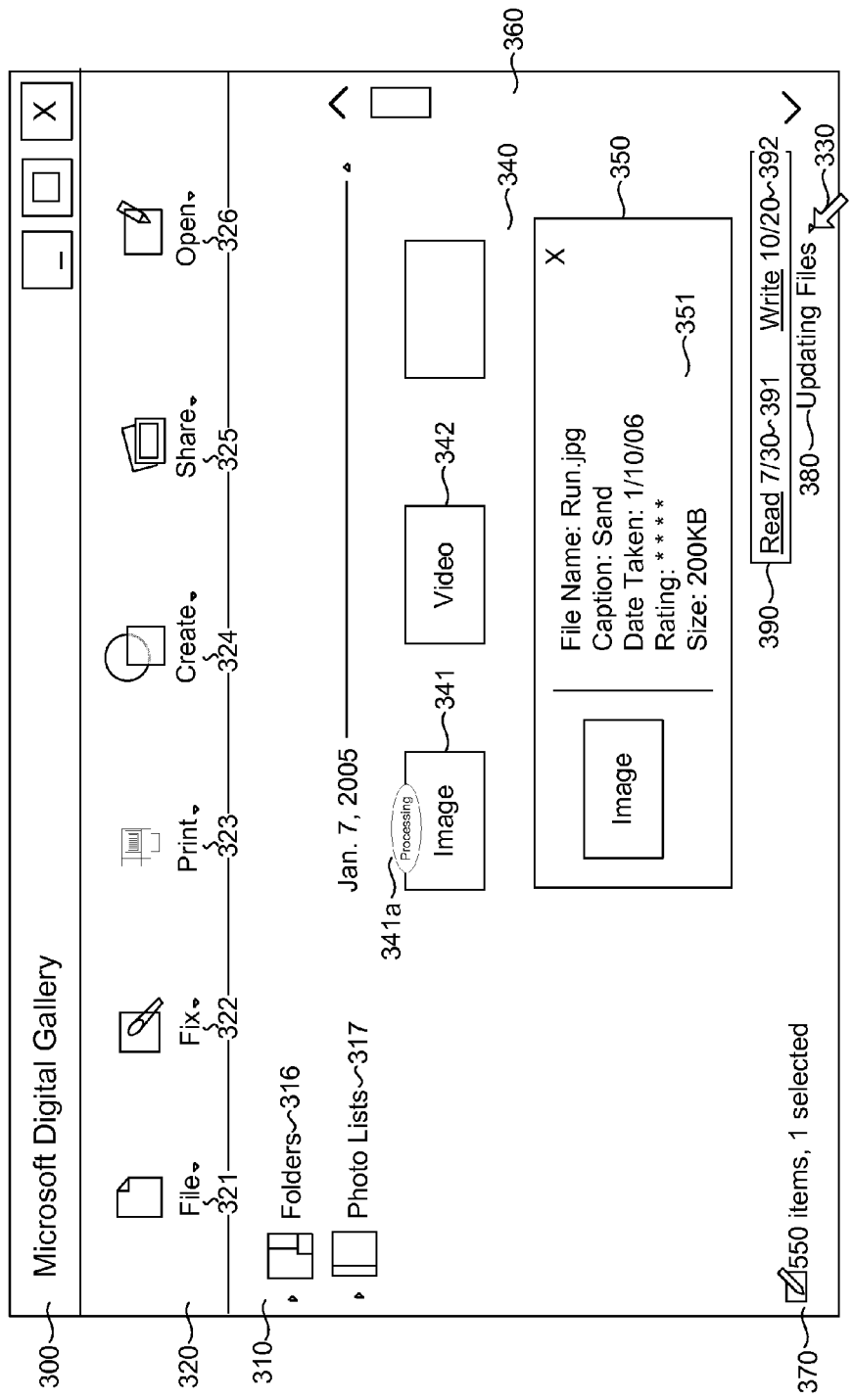
FIG. 3 is a graphical user interface that illustrates the multimedia application and status information generated, according to an embodiment of the invention.

FIG. 3 is a graphical user interface 300 that illustrates the multimedia organization application and status information generated, according to an embodiment of the invention. The graphical user interface may include a command section 220, a thumbnails section 340, and a status notifications 341*a*, 350, 380 and 390. The command section 320 includes a list of commands 321-326 that may be performed on the multimedia files. The thumbnail section 340 displays the thumbnails 341-342 for each multimedia file. The status notifications 341*a* is an icon that informs the user that multimedia file associated with the thumbnail is being processed by the background thread. Additionally, the status notification 341*a* may also indicate whether the multimedia file is currently being processed or whether the multimedia file is waiting to be processed. Generally, the user may be informed that multimedia files are being processed via a message 380 displayed on the lower right hand of the application. In an alternate embodiment the message 380 may be displayed on any of the four corners of the graphical user interface. When a mouse 330 is hovered near or over the message indicating multimedia files are being processed, a hint message 390 is generated which indicates that the number of files remaining on the read and write queues, respectively 391 and 392. The hint message 390 may include a reference to detailed listings of the read and write queues 391-392. The details of the read and write queue are discussed below with reference to FIG. 4. Accordingly, a user may be provided general status notification information through an icon 341*a*, or through messages 380 and 390 rendered on the graphical user interface when one or more metadata updates are being processed by a background thread. In an alternate embodiment, the general notifications may be combined with a background notification 350 that provides the metadata 351 of the current file being processed by the background thread. The metadata 351 includes all metadata associated with the multimedia file except for the metadata associated with the metadata update.

In another embodiment, the multimedia organization application may be utilized to add metadata to each multimedia file. When the user adds new metadata or alters metadata, the metadata database immediately reflects the update. The metadata update must be propagated to the multimedia file to ensure consistency. Here, the metadata changes are stored on the write queue 392. When the background thread processes the write queue 392, the general status notification 341*a* is generated to inform the user of the current file being processed. Moreover, the general status notification messages 380 and 390 may inform the user of the remaining metadata updates. In certain embodiments, metadata updates associated with a multimedia file are grouped together on the write queue 392 to reduce the amount of disk operations required to update the multimedia files.

The read and write queues are data structures that are generated by the photo organization application to store references to multimedia files, and the metadata updates associated with each multimedia file. When a metadata update is added to either the read or write queue a check is made to determine whether a reference to the file is already on the queue. If the reference exists and the background thread is not processing the metadata update associated with the multimedia file, then the new metadata update is added to the list of metadata updates associated with the reference. In other word, when if the entry is a waiting state, additional metadata may be associated with the reference. In an embodiment, the reference may be unique numerical identifier that is associated with the multimedia file. The read and write queues group the metadata updates associated with the multimedia files based on the reference associated with the multimedia file. In an embodiment, the background thread may scan the read queue and write queue to determine whether each includes updates to the same multimedia file. In one instance, the metadata updates for the same multimedia files may be for different metadata attributes associated with the multimedia file. When the updates are for different attributes the read and write queues remain unaltered. In another instance, the metadata updates may be for the same metadata attributes. When the metadata updates are for the same metadata attributes another check is made to determine whether the updates conflict with each other. A conflict occurs when the values associated with the same metadata attribute for a multimedia files included in the read and write queues differ. If there is a conflict, the background thread looks to the timestamps associated with each update and the file having the lowest timestamp is set as the value to be synched. In an alternate embodiment, the highest timestamp value may be given priority. When the metadata update associated with the read queue is set as the synch value, the write queue entry is removed. On the other hand, when the value associated with the write queue is set as the synch value, the read queue entry is removed.

Figure 2:
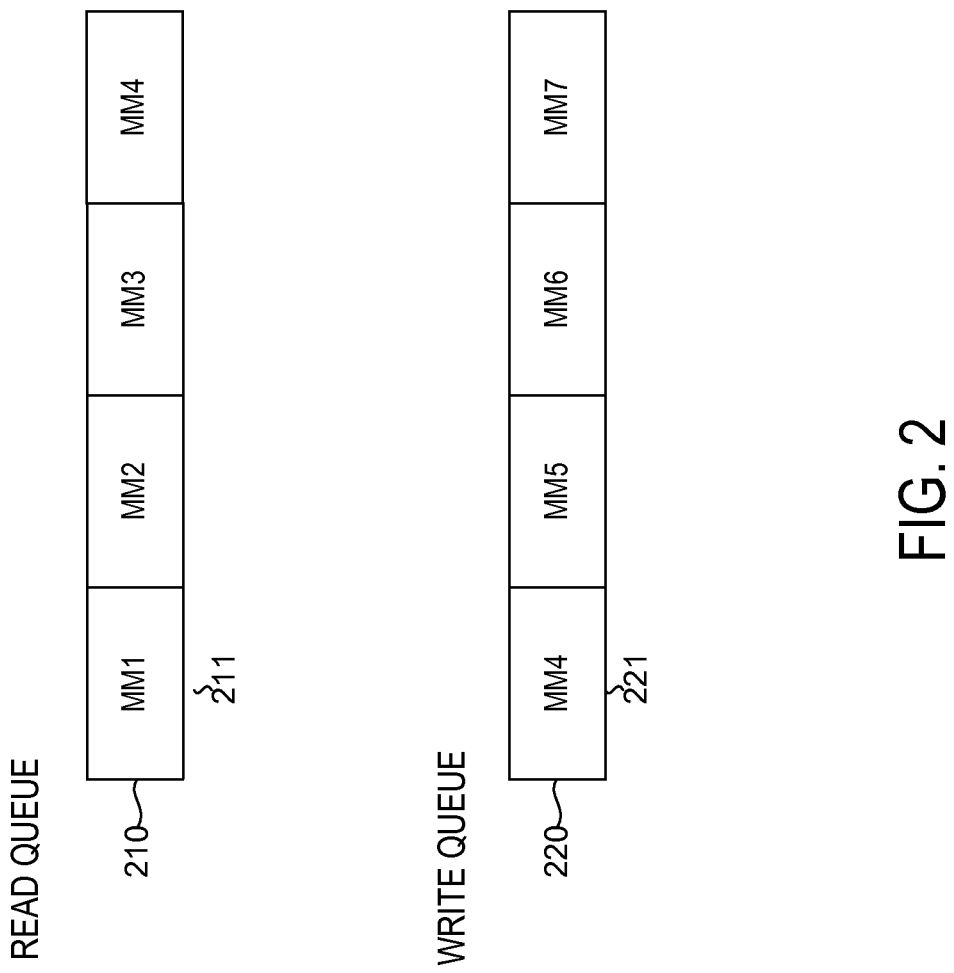
FIG. 2 is a schematic diagram that illustrates read and write queues, according to embodiments of the invention.

FIG. 2 is a schematic diagram that illustrates read and write queues 210 and 220, according to embodiments of the invention. The read queue 210 is generated or updated when a background thread detects discrepancies between the multimedia file and the metadata database. The read queue 210 may also be generated or updated when new multimedia files that are not included in the metadata database are imported from a multimedia capture device. The metadata updates are stored on read queue and associated with a reference 211 to the multimedia file. When the background thread processes the metadata updates stored in the read queue 210, the metadata database is updated to add or alter the metadata.

The write queue 220 is generated when the user utilizes the multimedia organization application to alter metadata associated with a multimedia file or to add new metadata to the multimedia file. The updates made via the multimedia organization application are stored to the multimedia database. In turn, the write queue 220 is modified to include the updates stored in the multimedia database. The write queue 220 stores the metadata updates and a reference 221 to the multimedia file. The background thread processes the write queue 220 to propagate updates from the metadata database to the multimedia files. Accordingly, the read and write queue 210 and 220 are utilized to keep the metadata database and multimedia files consistent with each other.

In certain embodiments, the write queue and read queues may provide detailed status notifications to a graphical user interface. The status notifications may include the priority of each multimedia file included on the write and read queues, the condition of each multimedia file, and the updates associated with each multimedia file. The read and write queues group the updates based on the multimedia files associated the update.

In an embodiment, the priority assigned to the metadata updates is based on a first-in-first-out ordering mechanism. The first-in-first-out mechanism may be altered through the graphical user interface. The user may decide to move an important metadata update to be the next metadata update processed. Moreover, the user may specify a group of metadata updates associated with the multimedia files to be processed. Accordingly, the user may dynamically alter the priorities of the files included in the read and write queues.

Figure 4:
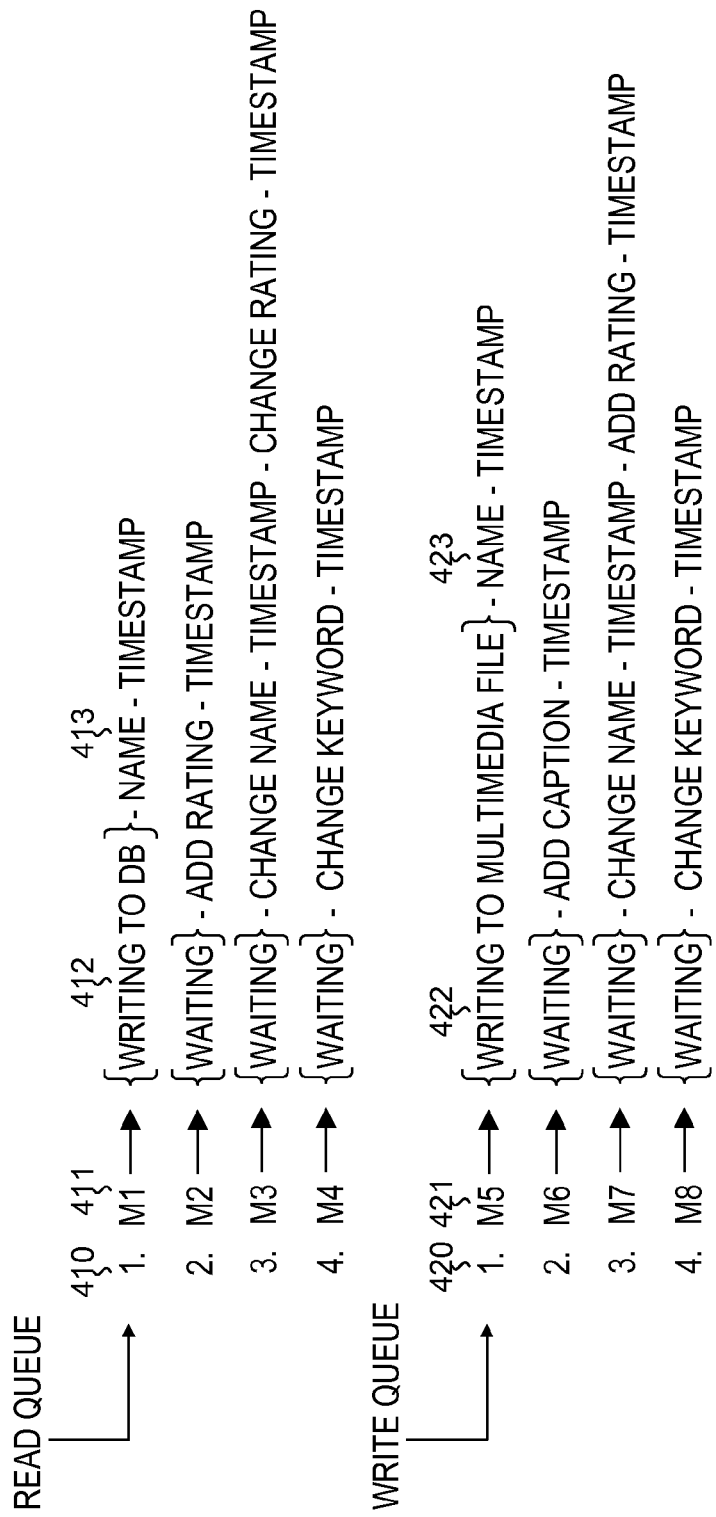
FIG. 4 is a schematic diagram that illustrates the details of the read and write queues, according to embodiments of the invention.

FIG. 4 is a schematic diagram that illustrates the details of the read and write queues, according to embodiments of the invention. The read queue may include a priority 410, a reference to a multimedia file 411, a condition associated with the metadata update 412, and a listing of the metadata updates associated with the multimedia file 413. The priority 410 may be assigned automatically using a first-in-first-out mechanism or the priority 410 may be assigned manually. The condition 412 may include writing or waiting states. During the writing state, the metadata updates are applied to the multimedia database when the entry in the read queue is in the writing state. When the entry is in the writing state additional updates may not be added to read queue. However, during the waiting state, additional metadata updates may be associated with the entries having a waiting state. The listing 413 of metadata updates associated with each entry may include a timestamp indicating when the update was detected by the background thread.

The write queue may include a priority 420, a reference to a multimedia file 421, a condition associated with the metadata update 422, and a listing of the metadata updates associated with the multimedia file 423. Similar to read queue, the priority 420 may be assigned automatically using a first-in-first-out mechanism or the priority 420 may be assigned manually. The condition 422 may include writing or waiting states. During the writing state, the metadata updates are applied to the multimedia file when the entry the write queue is in the writing state. While the entry is in the writing state additional metadata updates may not be added. However, during the waiting state, additional metadata updates may be associated with the entries having a waiting state. The listing 423 of metadata updates associated with each entry may include a timestamp indicating when the update was entered by the by a user via the graphical user interface or received by the metadata database. In certain embodiments, the background thread may process the read and write queues simultaneously.

In an embodiment, a multimedia organization application may provide a user with status information related to metadata updates. The status information is generated and presented on a graphical user interface associated with the multimedia organization application. The status notification may provide a tool tips that indicate the number of files remaining to be processed. The status notification may provide general status notifications or detailed notifications. The general notifications may include information presented by an icon while the detailed notifications provides a list of multimedia files and their associated updates. The detailed notifications allow a user to modify the priorities associated with the multimedia files. Accordingly, if the user needs to electronic mail a multimedia file, the user may change the priority of the file to ensure that the multimedia file is processed next. In certain embodiments, while the file is processing a general notification icon is associated with a thumbnail of the file, and a notification dialog may be open to present the current metadata values of the multimedia files except the value currently being processed. The status notification may also in an estimate of the approximate time it may take to complete the processing of the read and write queues.

A computer-implemented method is a method implemented at least in part by a machine or a method implemented at least in part by a computing device. The machine or computing device includes, but are not limited to, a laptop, desktop, personal digital assistant, or multi-processing systems, or any device capable of storing or executing instructions associated with the following methods.

Figure 5:
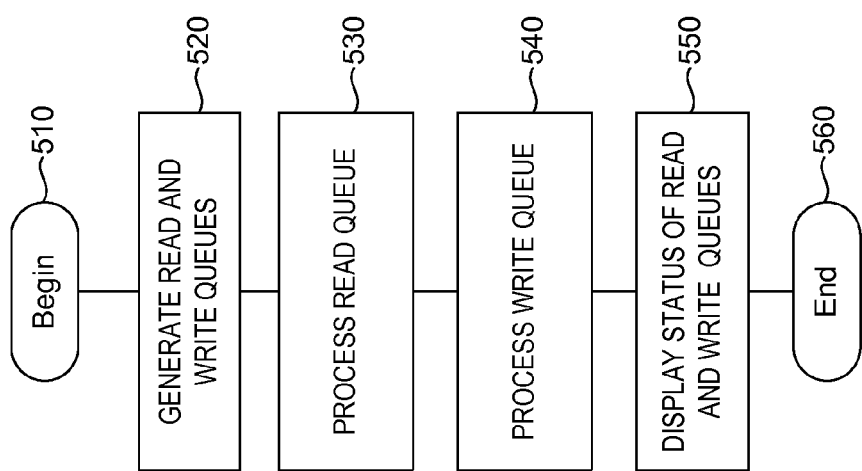
FIG. 5 is a logic diagram that illustrates a computer-implemented method to generate the status of metadata updates.

FIG. 5 is a logic diagram that illustrates a computer-implemented method to generate the status of metadata updates. The computer-implemented method begins in step 510 after the background thread has detected updates or after the user has added or entered new metadata in the metadata database. In step 520, the read and write queues are generated to store the metadata updates and references to the multimedia files. In turn, the read and write queues are processed to propagate the updates to the multimedia files and the metadata database, in steps 530 and 540. In step 550, status notifications indicating that multimedia files are being processed are displayed by the graphical user interface. The computer-implemented method ends in step 560.

The background thread is defaulted to be a low priority thread. The background thread may utilize the tracker to detect conflicts between metadata associated with multimedia files stored on the disk and metadata stored in the metadata database. In certain embodiments of the invention, the priority of the background thread may be increased when the computer system utilization is below a specified threshold. When the computer system utilization is below a specified threshold, the priority of background thread may be increased to medium or high. The medium and high priority state, give the background thread access to more processor cycles and memory. Accordingly, the when the background thread is in the medium or high priority, the background thread processes the read and write queues faster that if the background thread where in a low priority state. In certain embodiment of the invention, the priorities associated with tracker, extractor and notifier may be configured independently and separately to different priority states.

Figure 6:
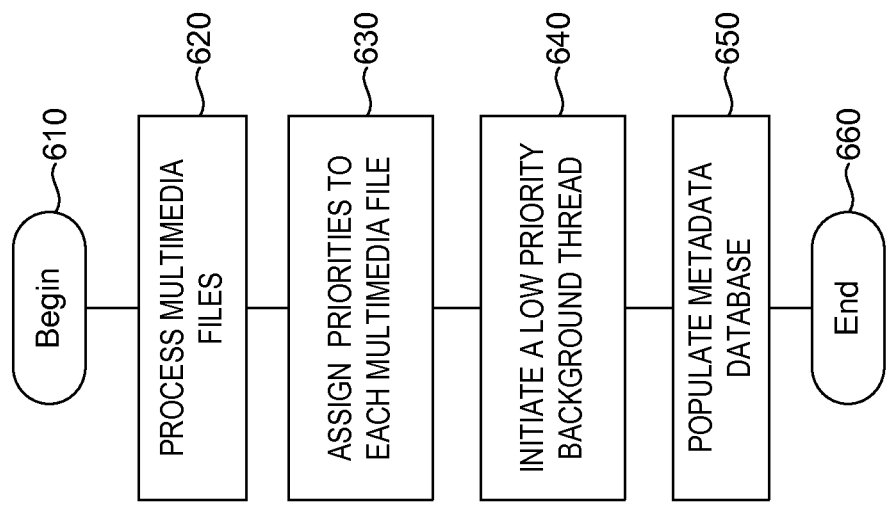
FIG. 6 is a logic diagram that illustrates a computer-implemented method to process the multimedia files, according to an embodiment of the invention.

FIG. 6 is a logic diagram that illustrates a computer-implemented method to process the multimedia files, according to an embodiment of the invention. The method begins in step 610, when a photo organization application is launched. In step 620 multimedia files and metadata associated with the multimedia files that are not included in the metadata database are added to the read queue for further processing. Concurrently, a user may utilize the photo organization application to add metadata to the metadata database. The metadata updates received from the photo organization application are sent to the write queue for further processing. In step 630, the multimedia files included in the read and write queues are assigned varying priories based on a first-in-first-out ordering mechanism. In step 640, the low priority background thread begins processing the read and write queues. In step 650, the metadata database is updated to include metadata updates included in the read queue. Additionally, the multimedia files are updated to include the metadata updates included in the write queue. The computer-implemented method ends in step 660.

In summary, the status notifications provide the users with information about the files being processed to update metadata associated with the metadata database of the multimedia files. Metadata updates are communicated bi-directionally between the multimedia file and the metadata database via read and write queues. Additionally, detailed status notifications utilize the read and write queues to present the listing and priorities for the metadata updates and the associated multimedia files. The priorities of the multimedia files may be altered via a graphical user interface that present the detailed status notifications.

In an alternate embodiment of the invention, a data structure embodied on a computer readable medium includes, read and write queues having a reference uniquely indicating an associated multimedia file, and a collection of metadata updates associated with the each multimedia file. The read queue is populated based on the discrepancies between the multimedia file and the metadata database, while the write is populated based on user-defined entries received from a graphical user interface.

The foregoing descriptions of the invention are illustrative, and modifications in configuration and implementation will occur to persons skilled in the art. For instance, while the present invention has generally been described with relation to FIGS. 1-6, those descriptions are exemplary. Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims. The scope of the invention is accordingly intended to be limited only by the following claims.

We claim:

1. A computing system comprising:
   one or more processors; and
   one or more computer-readable media having instructions stored thereon, which, when executed by the one or more processors, provide the computing system with:
      a metadata database to store metadata entries respectively associated with multimedia files;
      a read queue to track discrepancies between the multimedia files and the metadata database, wherein the discrepancies represent first metadata updates applied to metadata of one or more of the multimedia files that have yet to be applied to corresponding metadata entries of the metadata database;
      a write queue to track second metadata updates applied to one or more entries of the metadata database that have yet to be applied to metadata of corresponding multimedia files;
      a graphical user interface to:
         receive status notifications related to the first metadata updates and the second metadata updates;
         generate processing icons to be superimposed on respective thumbnail representations of each multimedia file that is referenced in the read queue and write queue, and
         provide a hint message that indicates a quantity of the first metadata updates and the second metadata updates that remain in the read queue and the write queue, respectively; and
      a background thread to:
         process the read and write queues; and
         present the status of the metadata updates to the graphical user interface, wherein the background thread is assigned a priority based on resource utilization of the computer system.

2. The computer system of claim 1, wherein the background thread is assigned a low priority when the utilization of the resources of the computer system is above a threshold.

3. The computer system according to claim 1, wherein the background thread is assigned a high priority when utilization of the resources of the computer system is below a threshold.

4. The computer system according to claim 1, wherein the status notification of the metadata updates includes a list of files remaining on the read and write queues.

5. The computer system according to claim 1, wherein the status notification is the number of files remaining on the read and write queues.

6. The computer system according to claim 1, wherein the status notification is generated when all the metadata updates on the read and write queues are processed.

7. The computer system according to claim 1, wherein the background thread processes the read and write queues faster in a high priority state than when in a low priority state.

8. The computer system according to claim 1, wherein conflicting metadata updates on the read and write queues are resolved based on timestamps associated with the metadata updates.

9. One or more computer memory devices storing computer-executable instructions that, when executed by a processor of a computing device, cause the computing device to perform the following:
   store metadata associated with multimedia files as metadata entries in a metadata database;
   track first metadata updates applied to metadata of one or more of the multimedia files that have yet to be applied to corresponding metadata entries of the metadata database in a read queue;
   track second metadata updates applied to one or more entries of the metadata database that have yet to be applied to metadata of corresponding multimedia files in a write queue;
   receive status notifications related to the first metadata updates and the second metadata updates at a graphical user interface;
   generate processing icons for each multimedia file referenced in the read queue and write queue;
   superimpose, within the graphical user interface, the processing icons on respective thumbnail representations of each multimedia file that is referenced in the read queue and write queue;
   cause a hint message to be displayed, within the graphical user interface, that indicates a quantity of the first metadata updates and the second metadata updates that remain in the read queue and the write queue, respectively;
   process the read and write queues via a background thread; and
   assign a priority to the background thread based on utilization of the resources of computer system.

10. The one or more computer memory devices of claim 9, wherein the background thread is assigned a low priority when the utilization of the resources of the computer system is above a threshold.

11. The one or more computer memory devices according to claim 9, wherein the background thread is assigned a high priority, when utilization of the resources of the computer system is below a threshold.

12. The one or more computer memory devices according to claim 9, wherein the status notification of the metadata updates includes a list of files remaining on the read and write queues.

13. The one or more computer memory devices according to claim 9, wherein the status notification is the number of files remaining on the read and write queues.

14. The one or more computer memory device according to claim 9, wherein a status notification is generated when all the metadata updates on the read and write queues are processed.

15. The one or more computer memory device according to claim 9, wherein the background thread processes the read and write queues faster in a high priority state than when in a low priority state.

16. The one or more computer memory device according to claim 9, wherein conflicting metadata updates on the read and write queues are resolved based on timestamps associated with the metadata updates.

17. A method for managing threads during multimedia processing, the method comprising:
    storing metadata associated with multimedia files as metadata entries in a metadata database;
    tracking first metadata updates applied to metadata of one or more of the multimedia files that have yet to be applied to corresponding metadata entries of the metadata database in a read queue;
    tracking second metadata updates applied to one or more entries of the metadata database that have yet to be applied to metadata of corresponding multimedia files in a write queue;
    receiving status notifications related to the first metadata updates and the second metadata updates at a graphical user interface;
    generating processing icons for each multimedia file referenced in the read queue and write queue;
    superimposing, within the graphical user interface, the processing icons on respective thumbnail representations of each multimedia file that is referenced in the read queue and write queue;
    causing a hint message to be displayed, within the graphical user interface, that indicates a quantity of the first metadata updates and the second metadata updates that remain in the read queue and the write queue, respectively;
    processing the read and write queues via a background thread to apply the first metadata updates, tracked by the read queue, to the corresponding metadata entries of the metadata database, and to apply the second metadata updates, tracked by the write queue, to the metadata of the corresponding multimedia files;
    assigning a low priority to the background thread as a default;
    receiving a user request to increase the priority of the background thread; and
    assigning an increased priority to the background thread based on utilization of the resources of computer system.

18. The method according to claim 17, wherein a status notification is generated to inform a user of a multimedia application whether a metadata update for one or more multimedia files is being processed by the background thread or waiting to be processed by the background thread.

19. The method according to claim 17, wherein hovering over the status notification reveals a hint message and allows the user to modify processing order for each multimedia file in the read queue or write queue.

20. The method according to claim 17, wherein the hint message provides the number of files remaining on the read and write queues.

* * * * *